United States Patent [19]

Tsai et al.

[11] Patent Number: 5,460,760
[45] Date of Patent: Oct. 24, 1995

[54] METHOD OF EXTRUDING ETHYLENE-VINYL ALCOHOL COPOLYMER (EVOH)

[75] Inventors: Mingliang L. Tsai, East Brunswick; Tien-Kuei Su, Belle Meade, both of N.J.

[73] Assignee: Mobil Oil Corporation, Fairfax, Va.

[21] Appl. No.: 228,773

[22] Filed: Apr. 18, 1994

[51] Int. Cl.⁶ .......................... B29C 47/12; B29C 47/94
[52] U.S. Cl. .................. 264/39; 264/127; 264/130; 264/169; 264/317; 425/461; 425/467; 425/DIG. 55
[58] Field of Search .................. 264/169, 39, 130, 264/127, 317; 425/461, 467, DIG. 55

[56] References Cited

U.S. PATENT DOCUMENTS

| | | |
|---|---|---|
| 3,125,547 | 3/1964 | Blatz . |
| 3,847,728 | 11/1974 | Hirata et al. . |
| 3,894,985 | 7/1975 | Coombs . |
| 4,076,698 | 2/1978 | Anderson et al. .................. 526/348.6 |
| 4,264,294 | 4/1981 | Ruiz .................................. 425/467 |
| 4,293,473 | 10/1981 | Eastman . |
| 4,324,748 | 4/1982 | Hatakeyama et al. ................ 425/461 |
| 4,581,406 | 4/1986 | Hedberg et al. ..................... 524/520 |
| 4,610,914 | 9/1986 | Newsome .............................. 428/216 |
| 4,780,508 | 10/1988 | Cunningman et al. ................ 525/164 |
| 4,812,267 | 3/1989 | Hoffmann et al. ..................... 264/169 |
| 4,826,908 | 5/1989 | Cunningham et al. ................ 524/448 |
| 5,008,056 | 4/1991 | Kurtz et al. ........................... 264/130 |
| 5,013,792 | 5/1991 | Chapman, Jr. et al. ............... 525/166 |
| 5,089,200 | 2/1992 | Chapman, Jr. et al. ............... 425/461 |
| 5,132,368 | 7/1992 | Chapman, Jr. et al. ............... 525/165 |
| 5,192,620 | 3/1993 | Chu et al. .............................. 428/461 |
| 5,281,381 | 1/1994 | Su ........................................ 264/130 |
| 5,374,683 | 12/1994 | Morgan ................................ 525/200 |

FOREIGN PATENT DOCUMENTS

| | | |
|---|---|---|
| 655461 | 1/1963 | Canada . |
| 46-1269 | 1/1971 | Japan ..................................... 425/461 |
| 57-738 | 4/1982 | Japan . |

*Primary Examiner*—Jeffery R. Thurlow
*Attorney, Agent, or Firm*—Alexander J. McKillop; Malcolm D. Keen; Marina V. Schneller

[57] ABSTRACT

According to the present invention, the copolymers of ethylene vinyl alcohol are extruded using extrusion equipment coated with a fluoropolymer. This method improves the processability, alleviates/slows down die buildup, improves the extrudate quality by reducing die lines on surfaces of the extruded product.

7 Claims, No Drawings

5,460,760

METHOD OF EXTRUDING ETHYLENE-VINYL ALCOHOL COPOLYMER (EVOH)

FIELD OF THE INVENTION

The invention relates to a method for extruding ethylene vinyl alcohol copolymers. According to the present invention, the polymers are extruded or coextruded using extrusion equipment coated with a fluoropolymer. Methods for applying the coating can be either by a solution of the fluoropolymer in a suitable solvent or by melt processing. This method improves the processability, slows die buildup of the EVOH, improves the extrudate quality by reducing die lines on surfaces of the extruded products.

BACKGROUND OF THE INVENTION

Ethylene-vinyl alcohol copolymers, which are strongly hydrogen-bonded, provide superior oxygen barrier and optical properties. They have been commonly used in high barrier packaging applications, particularly in multilayer packaging films. However, during extruding EVOH as a single layer or an outer layer of coextruded (multilayer) articles, it usually accumulates around the die lips. This die buildup can cause production/product problems which result in extrusion line shutdown. For example: 1) It can create die lines on the extrudate, which result in an article with poor surface appearance; 2) The die buildup can break from the die lips and stick on the extrudate (sheet), which causes film splitting during the subsequent orientation process. Consequently, the extrusion line has to be shut down.

SUMMARY OF THE INVENTION

This invention describes the method of extrusion of the copolymers of ethylene and vinyl alcohol to eliminate die buildup of the copolymer.

The invention describes a method of solution coating the dies to eliminate the die buildup. It can be done by conventional solution coating technique, e.g. dipping, brushing, etc. The die can be coated to any desired thickness. In addition, the coated layer can be easily removed from the die by the same solvent used in its application.

DETAILED DESCRIPTION OF THE INVENTION

A solution of inert polymer is applied to the portion of the die, which contacts the ethylene-vinyl alcohol copolymer. As noted above, the ethylene-vinyl-alcohol copolymer content can be as a sole lamina, resulting from coextrusion. Alternatively, coextrusion of ethylene vinyl alcohol copolymers with other film forming substrates can be undertaken so that the ethylene vinyl alcohol copolymer layer comprises 1 to 25 weight percent of the composite. The ethylene content of the EVOH copolymer is less than 50 mole %, preferably 27 to 48. Other film forming substrate materials include polyester polyamide high density polyethylene, white opaque oriented polypropylene and a tie layer, e.g. maleic anhydride grafted polypropylene.

A solution of inert polymer is applied to the portion of the die, and/or barrel and/or screw which contacts the ethylene vinyl alcohol copolymer(s). The amount of the inert polymer is sufficient to form an impenetrable sheath between the melt which is being extruded and the extruder equipment (die and/or barrel and/or screw) formed of iron or steel (and/or copper and/or zinc). Coating materials such as inorganic polymers or fluorine containing polymers can be used. Preferred are polyvinylidene fluoride containing polymers. Experiments below were conducted using DuPont Viton A fluoroelastomer which is based upon vinylidene fluoride and hexafluropropene. Acetone, methyl ethyl butene, tetrahydrofuran, and the like, which are polar solvents, are common solvents for Viton A. The solutions of polymer can have contents ranging from 0.1 to 10 percent polymer.

In accordance with the invention, a method of solution coating the dies to eliminate the die buildup, is described. It can be done by conventional solution coating technique, e.g. dipping, brushing etc. The die can be coated to any desired thickness. In addition, the coated layer can be easily removed from the die by solvent.

After coating the equipment surfaces with the polymer, the polymer solvent is evaporated. As a result, the coated surface is dried. The coating on the surface of the extrusion acts as a sheath through which the ethylene vinyl alcohol is actually extruded: the coating acts as an impenetrable barrier which eliminates contact between the ethylene vinyl alcohol and the iron or steel extrusion equipment.

The molten materials in preparation for extrusion may contain commercial quantities of color and antiblocking agents. The materials may contain color and antiblocking agents ranging from 0 to 10%, percentage based on the blend. In addition to the polymeric components, the extrusion melts may contain microtalc, stabilizer, compatibilizers, pigments, and the like. The melts may be prepared using any of various methods known in the art. For example, pellets of the two polymers may be dry blended and the blend added directly to a blown film extruder, e.g., a Sterling extruder, or to a cast film line, e.g., an Egan line, to produce films having a thickness, for example, of about 0.5 to 5 mils. Blown film is relatively thin as compared to film or sheet used in molding operations and is generally used in flexible packaging. In this process, tubular products, for example, bags, can be produced. The tube may also be slit to form flat film. The film may also be oriented.

The following examples illustrate specific embodiments of the invention.

EXAMPLES

This invention describes a new, novel method of processing EVOH. We employed a Brabender extruder equipped with a capillary die, having a diameter of 1/16" and a camera set-up to record the image of the extruder at the die exit. We extruded EVOH (EVAL ECG156B) under a relatively severe condition, i.e. a) the EVOH, which has been exposed to air, was used "as is" without drying prior to extrusion and b) a relatively high shear rate around 1000 $sec^{-1}$ was used.

Under this extreme condition, appreciable amount of die buildup for EVOH took place within less than one minute of extrusion. After coating the die with a fluoroelastomer solution (0.5% of Dynamar FX-2231 from 3M in acetone), we extruded the EVOH again under the same conditions. This time the die buildup slowed down significantly and it did not occur until 3 minutes passed by. In addition, the amount of die buildup was much less.

We also extruded EVOH under a normal condition: we used fresh EVOH from a sealed bag and extruded at a melt temperature of 230° and shear rate around 500 $sec^{-1}$.

Under this condition, the die buildup took place within 10 minutes of extrusion. After coating the die with the fluoroelastomer solution, we extruded EVOH again under the same conditions. This time the die buildup did not occur even after 30 minutes of extrusion.

Example 1

This example illustrates the effectiveness of using a fluoroelastomer to process EVOH in a pilot equipment. We employed a five-extruder system equipped with a 12 inch wide die and a Cloeren selector plug to make a multilayer film structure. This coextrusion system, consisting of a 3.5 inch main extruder, two 2 inch satellite extruders, and two 1.5 inch satellites, typically has an output around 300 pounds/hour. An EVOH with 48% ethylene content was extruded as received without further drying prior to extrusion at a shear rate around 300 $sec^{-1}$ at the die lip. While the die temperature was set at 480° F., the melt temperature of the EVOH was maintained at 450° F.

Under this condition, a substantial amount of die lip buildup on the EVOH side took place in less than forty-five minutes. Then the EVOH blended with 50 ppm of fluoroelastomer (Viton free flow SAX-7401 made by DuPont) was extruded in the same extruder at the same conditions. This time the die lip buildup slowed down significantly. Only very minor buildup was observed after extruding for four and half hours as compared to an appreciable amount of buildup in forty-five minutes in the control without using any fluoroelastomer. After that 25 ppm of fluoroelastomer in EVOH was continued to extrude and no further buildup deterioration was recorded.

Example 2

This example further demonstrates a novel method of processing EVOH. The same equipment, as described in Example 1, was used.

Here we coated the die lip with a fluoroelastomer solution (about 10 grams of 0.5% of Dynamer FX-2231 from 3M acetone) instead of blending the fluoroelastomer into EVOH resin. Very minor die lip buildup was observed after running for four and half hours. The die lip was cleaned, and then the same coating was applied onto the die lip which eventually lasted for another 15 hours as compared to an appreciable amount of buildup in forty-five minutes in the control without using any fluoroelastomer coating.

What is claimed is:

1. A process for extruding molten copolymer of ethylene and vinyl alcohol, wherein said copolymer on contact with extrusion equipment comprising a die and/or barrel and/or screw of iron or steel results in plugging deposits, of copolymer, comprising providing an impenetrable inert polymeric sheath on surfaces of said equipment which contact said copolymer during said extruding, wherein said polymeric sheath is inert under the conditions of extrusion;

extruding said molten copolymer through said sheath at temperatures ranging from 160° to 250° C.; and substantially reducing buildup due to decomposition of the copolymer.

2. The process of claim 1, wherein said sheath is provided by forming a solution of a polymer comprising polyvinylidene fluoride in a solvent for said polymer and applying said solution to said surfaces.

3. The process of claim 1, which further includes dissolving said sheath, after extruding.

4. The process of claim 2, which further includes dissolving said sheath, after extruding.

5. The process of claim 1 wherein a die lip is provided with said impenetrable sheath.

6. The process of claim 2 wherein a die lip is provided with said impenetrable sheath.

7. The process of claim 3 wherein a die lip is provided with said impenetrable sheath.

* * * * *